E. H. GENUIT.
AUTOMATIC POULTRY FEEDER.
APPLICATION FILED JUNE 21, 1919.
1,359,691.
Patented Nov. 23, 1920.
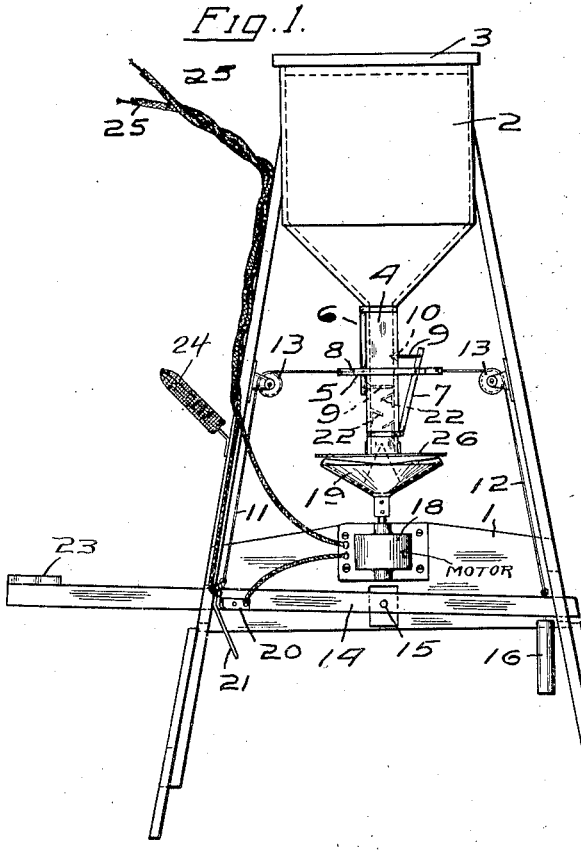
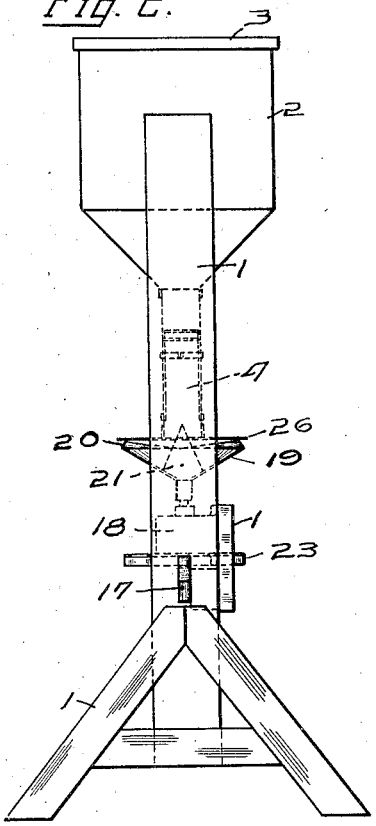
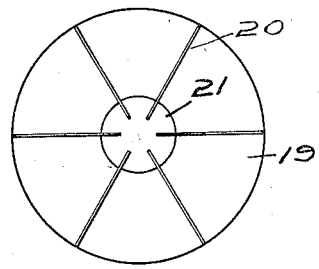
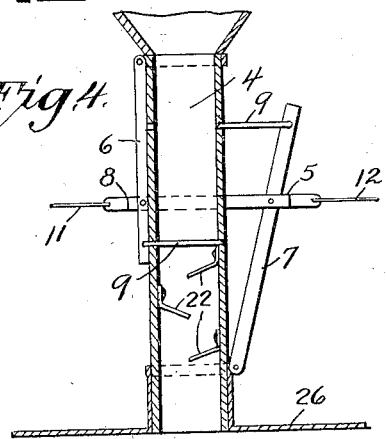
INVENTOR
Edward H. Genuit.
by
Owen, Owen & Crampton

UNITED STATES PATENT OFFICE.

EDWARD H. GENUIT, OF NAPOLEON, OHIO.

AUTOMATIC POULTRY-FEEDER.

1,359,691.　　　　　　　Specification of Letters Patent.　　Patented Nov. 23, 1920.

Application filed June 21, 1919. Serial No. 305,792.

*To all whom it may concern:*

Be it known that I, EDWARD H. GENUIT, a citizen of the United States, and a resident of Napoleon, in the county of Henry and State of Ohio, have invented a certain new and useful Automatic Poultry-Feeder; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

My invention has for its object to provide in an automatic poultry feeder, means whereby the feed will be scattered over a large area. It also has for its object to provide in such a feeder a motor means for scattering the feed and also to provide a means whereby a definite amount of the feed will be scattered at any given operation of the machine. It also has for its object to provide a means that will produce a timed interval between the starting of a motor means and scattering the feed before the scattering means receives the feed to be scattered in order that the motor means may overcome the inertia of the rotatable member and acquire the desired speed to centrifugally throw or scatter the feed. The invention has for its object other advantages and accomplishments which will appear from the following description and from examination of the drawing showing a structure containing the invention.

The invention may be contained in structures of different forms. To show a practical application of the invention I have selected one of the structures contained in the invention and shall describe it hereinafter. The particular structure selected is illustrated in the accompanying drawings.

Figure 1 of the drawings illustrates a side view of the feed mechanism Fig. 2 illustrates an end view, Fig. 3 illustrates a part of the scattering means, and Fig. 4 illustrates a sectional view of the chute for the feed.

In the drawings, 1 is the supporting frame, 2 is the hopper for the feed. The hopper is closed by a suitable cover 3. To the lower end of the hopper is connected a chute 4 of suitable size which is preferably square in its construction. To the chute 4 is secured a means 5 for controlling the supply of the feed. The means is provided with a pair of levers 6 and 7 that are pivotally connected to the chute 4 on opposite sides of the chute. The free ends of the levers 6 and 7 are connected together by a cross bar 8 and the ends of the levers are each provided with a flexible plate 9 that projects into an opening 10 which is preferably V-shaped, if the chute 4 is made of wood in order to allow for thickness of the wood to prevent binding of the plates 9 when they are shifted in and out of the chute by the operation of the levers 6 and 7. The plates 9 are spaced apart at such distance that the material collected between the planes of the plates will be the amount that it is desired to be scattered at each operation of the feeding device. The ends of the cross bar 8 are connected to chains 11 and 12 that pass over pulleys 13 and are in turn connected to a lever 14 on opposite sides of the fulcrum or pivot pin 15. The lever may be provided with a weight 16 in order that one end of the lever may be yieldingly and normally held down. The lever 14 extends through slots 17 formed in the frame 1 and consequently its rotative movements are limited by the ends of the slots 17. The weighted lever 14 operates to pull the arm 7 away from the chute 4 and the arm 6 toward or against the chute 4 and consequently to pull the plate 9 connected to the arm 7 practically out of the chute 4 or at least to open the chute sufficient to allow the feed to pass below the plate 9 connected to the lever 7 and to place the plate 9 connected to the lever 6 in the path of the feed through the chute 4 so as to prevent movement of the feed below the lower plate 9. When the lever 14 is tilted so as to lift the weight 16 the upper plate 9 closes off the chute and the lower plate 9 is pulled out and thus the feed in the chute located below the plane of the upper plate 9 escapes from the chute, which is the amount of the feed that it is desired to be scattered during each operation of the machine.

The feed is scattered by the operation of a motor means such as the electric motor 18 which is secured in any suitable manner to the frame 1. The shaft of the electric motor 18 is located in a vertical position and to it is connected a disk 19 that may be provided with radiating ribs 20. The disk 19 may also be provided with a cone 21, the axis of which is in alinement with the axis of the chute 4 so that the feed will be distributed not in the center of the disk 19 but at a point remote from the center. However, by the use of the cone it will be substantially equally distributed around the axis or center of the disk 19. If desired, the disk 19 may be made saucer or cone shaped in order to direct the feed that is scattered by the scattering means in an inclined upward direction and thus extend the radius in which the feed will be scattered. The motor 18 if it is a mechanical member, may be suitably tripped or otherwise controlled, but in the form of the invention shown, it is an electric motor and is connected to a contact 20 that is secured to the lever 14. A spring contact 21 of suitable length is connected to the frame 1 whereby connection will be established during a considerable movement of the lever 14 and thus will upon comparatively slight movement of the lever 14 immediately establish a circuit through the member and give opportunity to the motor to acquire the desired speed before the disk 19 receives the feed to be scattered. Moreover, means may be provided for delaying the deposit of the feed onto the disk 19 until the motor has reached the desired speed. In the form of the invention shown, the chute 4 may be provided with short baffle plates 22 which retard the movement of the feed downward through the chute after its escape from the lower plate 9. By this arrangement a small amount of feed will pass to the disk 19 and will be scattered within a very short radius of the machine or immediately around the machine, while the major portion of it will be scattered to a greater distance upon the machine and again a small portion will be scattered to the extreme radius to which the scattering means will throw the feed. The feed will thus be scattered quite uniformly over a large substantially circular area.

In order to start the machine, means is provided for inducing a bird or if it is used for feeding animals, an animal to operate the lever 14. For feeding poultry the lever 14 is provided with a roost or platform 23 and a suitable container or holder 24 for grain or feed is located on the frame 1 in such a way as to induce the bird to get on the roost 23 in its effort to secure some of the feed contained in the holder 24. The weight of the bird will cause the operation of the lever 14 against the operation of the weight 16 to start the motor and then cause the operation of the means 5 to allow the desired amount of feed to drop into the disk 19 during a controlled interval of time or such a time after the motor has reached the desired speed.

The electric motor 18 may be connected to a suitable source of supply by means of the wires 25. Also for purposes of protection means may be provided for covering the contacts 20 and 21 and also means may be provided for covering the disk 19 such as the disk or flange 26 that forms a part of or is connected to the lower end of the chute 4.

I claim:—

1. In an automatic feeder, a hopper, a chute connected to the hopper, interconnected levers connected to the chute and having closing plates for alternately closing the chute in separated planes, a weighted lever connected to the first named levers baffles located below the plates, a cone member having ridges, a distributing cone located in the cone member, a motor connected to the cone member, a pair of contacts connected to the motor and closed by the operation of the second named lever.

2. In an automatic feeder, a hopper, a chute connected to the hopper, a pair of closing plates for alternately closing the chute in separated planes, levers for operating the closing plates, a distributing member located beneath the chute, a lever for operating the first named levers, a motor connected to the distributing member, a paid of contacts connected to the motor, one of the contacts located on the second named lever and the other of the said contacts being in the form of a spring contact over which the first named contact moves, the said contacts closed immediately upon the operation of the lever and held closed during continued movements of the levers.

3. In an automatic feeder, a hopper, a chute connected to the hopper, interconnected levers connected to the chute and having closing plates for alternately closing the chute in separated planes, a weighted lever, cables connected to the second named lever on opposite sides of its fulcrum and to the first named levers, a distributing member located beneath the chute, a motor connected to the distributing member, a pair of contacts closed by the operation of the second named lever and connected to the motor.

In testimony whereof I have hereunto signed by name to this specification.

EDWARD H. GENUIT.